(12) United States Patent
Otani

(10) Patent No.: US 7,911,540 B2
(45) Date of Patent: Mar. 22, 2011

(54) TONE CONVERSION APPARATUS, IMAGE DISPLAY APPARATUS USING THE SAME, AND TONE CONVERSION METHOD

(75) Inventor: Takashi Otani, Saitama (JP)

(73) Assignee: Sony Corporation (JP)

( * ) Notice: Subject to any disclaimer, the term of this patent is extended or adjusted under 35 U.S.C. 154(b) by 1123 days.

(21) Appl. No.: 11/633,671

(22) Filed: Dec. 4, 2006

(65) Prior Publication Data

US 2007/0146548 A1  Jun. 28, 2007

(30) Foreign Application Priority Data

Dec. 6, 2005  (JP) ............................... P2005-352586

(51) Int. Cl.
*H04N 9/64* (2006.01)
*H04N 5/202* (2006.01)

(52) U.S. Cl. .................... 348/649; 348/254; 348/674

(58) Field of Classification Search .................. 348/649, 348/651–652, 656, 671, 674, 675, 254–256, 348/645, 441; 345/89, 596, 690, 600–601; H04N 9/64, 5/202
See application file for complete search history.

(56) References Cited

U.S. PATENT DOCUMENTS

| | | | | |
|---|---|---|---|---|
| 5,310,962 A | * | 5/1994 | Kimpara et al. | ................. 84/600 |
| 7,312,777 B2 | * | 12/2007 | Miyata et al. | .................... 345/89 |
| 7,379,096 B2 | * | 5/2008 | Takemoto | ................... 348/222.1 |
| 7,663,678 B2 | * | 2/2010 | Miyasaka | ..................... 348/254 |

FOREIGN PATENT DOCUMENTS

| JP | 05242244 A | 9/1993 |
|---|---|---|
| JP | 2004-133260 A | 4/2004 |
| JP | 2005-221593 A | 8/2005 |

OTHER PUBLICATIONS

Office Action from Japanese Applicatin No. 2005-352586, dated Nov. 30, 2010.

* cited by examiner

*Primary Examiner* — Trang U Tran
(74) *Attorney, Agent, or Firm* — Lerner, David, Littenberg, Krumholz & Mentlik, LLP

(57) ABSTRACT

In a tone conversion apparatus, a decision-processing section sequentially detects a signal level difference between pixels of an image in a predetermined direction thereof by using the image signal having a first number of bits, determines whether the signal level difference remains within a preset signal level difference, and determines a pixel which has the same signal level as that of an immediately preceding pixel that encounters the signal level difference and is consecutive with the immediately preceding pixel. A bit-allocation-processing section may also be utilized.

6 Claims, 14 Drawing Sheets

FIG. 4

| NUMBER-OF-CONSECUTIVE-PIXELS DETECTION SIGNAL | | | | | | VARIATION | | | | CORRESPONDING PATTERN |
|---|---|---|---|---|---|---|---|---|---|---|
| GP2 | GP3 | GP4 | GQ2 | GQ3 | GQ4 | PD5 | PD4 | PD3 | PD2 | |
| H | L | L | L | L | L | — | — | 0 | 2 | FIG. 3A |
| L | H | L | L | L | L | — | 0 | 1 | 3 | FIG. 3B |
| L | L | H | L | L | L | 0 | 1 | 2 | 3 | FIG. 3C |
| L | L | L | H | L | L | — | — | 0 | −2 | FIG. 3D |
| L | L | L | L | H | L | — | 0 | −1 | −3 | FIG. 3E |
| L | L | L | L | L | H | 0 | −1 | −2 | −3 | FIG. 3F |
| L | L | L | L | L | L | — | — | — | 0 | — |

FIG. 5

| DVa | Ha1=6 | Ha2=6 | Ha3=6 | Ha4=6 | Ha5=7 | Ha6=7 | Ha7=7 | Ha8=8 | Ha9=8 | Ha10=9 | Ha11=10 | Ha12=12 | Ha13=15 | Ha14=19 | Ha15=24 | Ha16=30 | Ha17=37 |
|---|---|---|---|---|---|---|---|---|---|---|---|---|---|---|---|---|---|
| PD1 | — | 6 | 6 | 6 | 6 | 7 | 7 | 7 | 8 | 8 | 9 | 10 | 12 | 15 | 19 | 24 | 30 |
| PD2 | — | — | 6 | 6 | 6 | 6 | 7 | 7 | 7 | 8 | 8 | 9 | 10 | 12 | 15 | 19 | 24 |
| PD3 | — | — | — | 6 | 6 | 6 | 6 | 7 | 7 | 7 | 8 | 8 | 9 | 10 | 12 | 15 | 19 |
| PD4 | — | — | — | — | 6 | 6 | 6 | 6 | 7 | 7 | 7 | 8 | 8 | 9 | 10 | 12 | 15 |
| PD5 | — | — | — | — | — | 6 | 6 | 6 | 6 | 7 | 7 | 7 | 8 | 8 | 9 | 10 | 12 |
| JSp | — | — | L | L | L | H | L | L | H | L | H | H | L | L | L | L | L |
| NB | — | — | — | — | — | 4 | — | — | 3 | — | 2 | 0 | — | — | — | — | — |
| LS | — | — | — | — | — | 0 | 1 | 2 | 3 | 0 | 1 | 3 | 0 | 2 | 0 | 0 | 0 |

DVb: Hb1=24, Hb2=25, Hb3=26, Hb4=27, Hb5=28, Hb6=29, Hb7=31, Hb8=32, Hb9=34, Hb10=36, Hb11=40, Hb12=48

FIG. 6

| DVa | Ha1 =10 | Ha2 =9 | Ha3 =8 | Ha4 =8 | Ha5 =7 | Ha6 =7 | Ha7 =7 | Ha8 =6 | Ha9 =6 | Ha10 =6 | Ha11 =6 | Ha12 =5 | Ha13 =4 | Ha14 =3 | Ha15 =2 | Ha16 =1 | Ha17 =0 |
|---|---|---|---|---|---|---|---|---|---|---|---|---|---|---|---|---|---|
| PD1 | — | 10 | 9 | 8 | 8 | 7 | 7 | 7 | 6 | 6 | 6 | 6 | 5 | 4 | 3 | 2 | 1 |
| PD2 | — | — | 10 | 9 | 8 | 8 | 7 | 7 | 7 | 6 | 6 | 6 | 6 | 5 | 4 | 3 | 2 |
| PD3 | — | — | — | 10 | 9 | 8 | 8 | 7 | 7 | 7 | 6 | 6 | 6 | 6 | 5 | 4 | 3 |
| PD4 | — | — | — | — | 10 | 9 | 8 | 8 | 7 | 7 | 7 | 6 | 6 | 6 | 6 | 5 | 4 |
| PD5 | — | — | — | — | — | 10 | 9 | 8 | 8 | 7 | 7 | 7 | 6 | 6 | 6 | 6 | 5 |
| JSp | — | — | H | H | L | H | L | L | H | L | L | L | H | H | H | H | H |
| NB | — | — | 0 | 0 | — | 2 | — | — | 3 | — | — | — | 4 | 0 | 0 | 0 | 0 |
| LS | — | — | — | — | — | 0 | 0 | 0 | -2 | 0 | -1 | -3 | 0 | -1 | -2 | -3 | 0 |
| DVb | | | | | | 40 Hb1 | 36 Hb2 | 32 Hb3 | 30 Hb4 | 28 Hb5 | 27 Hb6 | 25 Hb7 | 24 Hb8 | 23 Hb9 | 22 Hb10 | 21 Hb11 | 20 Hb12 |

FIG. 8

| DVa | Ha1 =-6 | Ha2 =-6 | Ha3 =-6 | Ha4 =-6 | Ha5 =-6 | Ha6 =-6 | Ha7 =-6 | Ha8 =-6 | Ha9 =-6 | Ha10 =-6 | Ha11 =-7 | Ha12 =-7 | Ha13 =-7 | Ha14 =-8 | Ha15 =-8 | Ha16 =-9 | Ha17 =-10 | Ha18 =-12 | Ha19 =-15 | Ha20 =-19 | Ha21 =-24 | Ha22 =-30 |
|---|---|---|---|---|---|---|---|---|---|---|---|---|---|---|---|---|---|---|---|---|---|---|
| PD1 | - | - | - | - | - | - | - | - | - | - | - | - | - | - | - | - | - | - | - | - | - | - |
| PD2 | - | 6 | 6 | 6 | 6 | 6 | 6 | 6 | 6 | 6 | 6 | 7 | 7 | 7 | 8 | 8 | 9 | 10 | 12 | 15 | 19 | 24 |
| PD3 | - | - | 6 | 6 | 6 | 6 | 6 | 6 | 6 | 6 | 6 | 6 | 7 | 7 | 7 | 8 | 8 | 9 | 10 | 12 | 15 | 19 |
| PD4 | - | - | - | 6 | 6 | 6 | 6 | 6 | 6 | 6 | 6 | 6 | 6 | 7 | 7 | 7 | 8 | 8 | 9 | 10 | 12 | 15 |
| PD5 | - | - | - | - | 6 | 6 | 6 | 6 | 6 | 6 | 6 | 6 | 6 | 6 | 7 | 7 | 7 | 8 | 8 | 9 | 10 | 12 |
| PD6 | - | - | - | - | - | 6 | 6 | 6 | 6 | 6 | 6 | 6 | 6 | 6 | 6 | 7 | 7 | 7 | 8 | 8 | 9 | 10 |
| PD7 | - | - | - | - | - | - | 6 | 6 | 6 | 6 | 6 | 6 | 6 | 6 | 6 | 6 | 7 | 7 | 7 | 8 | 8 | 9 |
| PD8 | - | - | - | - | - | - | - | 6 | 6 | 6 | 6 | 6 | 6 | 6 | 6 | 6 | 6 | 7 | 7 | 7 | 8 | 8 |
| PD9 | - | - | - | - | - | - | - | - | 6 | 6 | 6 | 6 | 6 | 6 | 6 | 6 | 6 | 6 | 7 | 7 | 7 | 8 |
| PD10 | - | - | - | - | - | - | - | - | - | 6 | 6 | 6 | 6 | 6 | 6 | 6 | 6 | 6 | 6 | 7 | 7 | 7 |
| PD11 | - | - | - | - | - | - | - | - | - | - | 6 | 6 | 6 | 6 | 6 | 6 | 6 | 6 | 6 | 6 | 6 | 7 |
| JSp | - | L | L | L | L | L | L | L | L | L | L | H | L | L | H | L | H | H | L | L | L | L |
| NB | - | - | - | - | - | - | - | - | - | - | - | 10 | 0 | 0 | 3 | 1 | 2 | 0 | 2 | 3 | 1 | - |
| LS | - | - | - | - | - | - | - | - | - | - | - | 0 | 0 | 0 | 1 | 1 | 2 | 2 | 2 | 3 | 3 | 0 |
| DVb | | | | | | | | | | | | 24 | 24 | 24 | 24 | 25 | 25 | 26 | 26 | 26 | 27 | 27 | 28 |
| | | | | | | | | | | | | Hb1 | Hb2 | Hb3 | Hb4 | Hb5 | Hb6 | Hb7 | Hb8 | Hb9 | Hb10 | Hb11 |

FIG. 9

| DVa | Ha1 =6 | Ha2 =6 | Ha3 =6 | Ha4 =6 | Ha5 =6 | Ha6 =6 | Ha7 =6 | Ha8 =6 | Ha9 =6 | Ha10 =6 | Ha11 =7 | Ha12 =7 | Ha13 =7 | Ha14 =8 | Ha15 =8 | Ha16 =9 | Ha17 =10 | Ha18 =12 | Ha19 =15 | Ha20 =19 | Ha21 =24 | Ha22 =30 |
|---|---|---|---|---|---|---|---|---|---|---|---|---|---|---|---|---|---|---|---|---|---|---|
| PD1 | — | 6 | 6 | 6 | 6 | 6 | 6 | 6 | 6 | 6 | 6 | 7 | 7 | 7 | 8 | 8 | 9 | 10 | 12 | 15 | 19 | 24 |
| PD2 | — | — | 6 | 6 | 6 | 6 | 6 | 6 | 6 | 6 | 6 | 6 | 7 | 7 | 7 | 8 | 8 | 9 | 10 | 12 | 15 | 19 |
| PD3 | — | — | — | 6 | 6 | 6 | 6 | 6 | 6 | 6 | 6 | 6 | 6 | 7 | 7 | 7 | 8 | 8 | 9 | 10 | 12 | 15 |
| PD4 | — | — | — | — | 6 | 6 | 6 | 6 | 6 | 6 | 6 | 6 | 6 | 6 | 7 | 7 | 7 | 8 | 8 | 9 | 10 | 12 |
| PD5 | — | — | — | — | — | 6 | 6 | 6 | 6 | 6 | 6 | 6 | 6 | 6 | 6 | 7 | 7 | 7 | 8 | 8 | 9 | 10 |
| PD6 | — | — | — | — | — | — | 6 | 6 | 6 | 6 | 6 | 6 | 6 | 6 | 6 | 6 | 7 | 7 | 7 | 8 | 8 | 9 |
| PD7 | — | — | — | — | — | — | — | 6 | 6 | 6 | 6 | 6 | 6 | 6 | 6 | 6 | 6 | 7 | 7 | 7 | 8 | 8 |
| PD8 | — | — | — | — | — | — | — | — | 6 | 6 | 6 | 6 | 6 | 6 | 6 | 6 | 6 | 6 | 7 | 7 | 7 | 8 |
| PD9 | — | — | — | — | — | — | — | — | — | 6 | 6 | 6 | 6 | 6 | 6 | 6 | 6 | 6 | 6 | 7 | 7 | 7 |
| PD10 | — | — | — | — | — | — | — | — | — | — | 6 | 6 | 6 | 6 | 6 | 6 | 6 | 6 | 6 | 6 | 7 | 7 |
| PD11 | — | — | — | — | — | — | — | — | — | — | — | 6 | 6 | 6 | 6 | 6 | 6 | 6 | 6 | 6 | 6 | 7 |
| JSp | — | — | — | — | — | — | — | — | — | — | L | H | L | L | H | L | H | H | L | L | L | L |
| NB | — | — | — | — | — | — | — | — | — | — | — | 10 | 0 | 0 | 3 | 1 | 2 | 0 | 2 | 3 | 3 | — |
| LS | — | — | — | — | — | — | — | — | — | — | — | 0 | 0 | 0 | 1 | 1 | 2 | 2 | 2 | 3 | 3 | 0 |
| DVb | 24 | 24 | 24 | 24 | 24 | 24 | 24 | 24 | 24 | 24 | 24 | 24 | 25 | 26 | 27 | 28 |
| | Hb1 | Hb2 | Hb3 | Hb4 | Hb5 | Hb6 | Hb7 | Hb8 | Hb9 | Hb10 | Hb11 |

FIG. 13

| 0/0 | 1/0 | 2/0 | 3/0 |
|---|---|---|---|
| 0/1 | 1/1 | 3/2 | |
| 0/2 | 2/3 | | |
| 0/3 | | | |

Uc, Ud, Ua, Ub $\left(\dfrac{LS}{LSv}\right)$

FIG. 14A  FIG. 14B
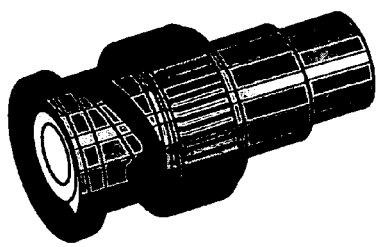
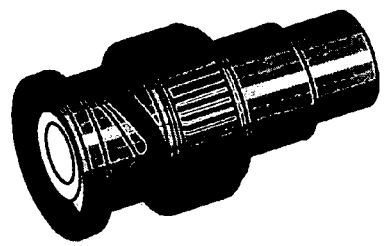
FIG. 14C  FIG. 14D

TONE CONVERSION APPARATUS, IMAGE DISPLAY APPARATUS USING THE SAME, AND TONE CONVERSION METHOD

CROSS-REFERENCE TO RELATED APPLICATION

The present application claims priority from Japanese Patent Application No. JP 2005-352586 filed on Dec. 6, 2005, the disclosure of which is hereby incorporated by reference herein.

BACKGROUND OF THE INVENTION

1. Field of the Invention

The present invention relates to a tone conversion apparatus, an image display apparatus using the same, and a tone conversion method, which are used in a digital television (TV) broadcasting or the like.

2. Description of Related Art

In the digital TV broadcasting, 8-bit quantization has been performed so as to generate an 8-bit tone image signal. Further, to display an image based on the 8-bit image signal on a display device such as a liquid crystal display (LCD), a plasma display, or a planar projector, a dither circuit has been used to enable pseudo-representation of at least 8-bit tones. Also, as performance of the display device itself is improved, such a display device has been realized as to enable representation of at least 8-bit tones without using a dither circuit.

Japanese Patent Application Publication No. 2004-133260 discloses an image display method and an image display apparatus in which if converting an image signal into a multi-tone image signal, tone conversion device reads the multi-tone image signal from a lookup table based on a signal level of an input image signal, thereby enabling tone conversion of the image signal.

It is certainly possible to increase a tone easily by increasing the number of bits of an A/D converter for an analog signal to at least eight. Since, however, the digital TV broadcasting employs an 8-bit tone signal, if this signal is used in display, due to its fewer tones, a striped pattern appears in an image based on a Ramp signal or a smooth-gradation image with a suppressed change in luminance. In a case where tone conversion is performed using the lookup table as described above, if input image signals have a same signal level, the post-tone conversion image signals also have the same signal level. Therefore, in an image in which pixels having the same signal level run consecutively, it may be difficult to display an image having a smooth change in tone even by performing tone conversion.

Thus, it is desirable to provide a tone conversion apparatus, an image display apparatus using the same, and a tone conversion method, which can perform tone conversion such that an image can have a smooth change in tone.

SUMMARY OF THE INVENTION

According to an embodiment of the present invention, there is provided a tone conversion apparatus that converts an image signal having a first number of bits into an image signal having a second number of bits which is larger than the first number of bits. The apparatus has a decision-processing section that sequentially detects a signal level difference between pixels of an image in a predetermined direction thereof by using the image signal having the first number of bits, determines whether the signal level difference remains within a preset signal level difference, and determines a pixel which has the same signal level as that of an immediately preceding pixel that encounters the signal level difference and is consecutive with the immediately preceding pixel if the signal level difference remains within the preset signal level difference. The apparatus also has a bit-allocation-processing section that adds a bit to the least significant bit of the image signal having the first number of bits to convert the image signal having the first number of bits into the image signal having the second number of bits, divides the signal level difference when the signal level difference remains within the preset signal level difference, and uses a result of the division to set the signal level difference between the consecutive pixels to the consecutive pixels determined by the decision-processing section.

According to another embodiment of the present invention, there is provided an image display apparatus that converts an image signal having a first number of bits into an image signal having a second number of bits which is larger than the first number of bits, and that generates a display drive signal to drive a display device based on the image signal having the second number of bits. The image display apparatus has a decision-processing section that sequentially detects a signal level difference between pixels of an image in a predetermined direction thereof by using the image signal having the first number of bits, determines whether the signal level difference remains within a preset signal level difference, and determines a pixel which has the same signal level as that of an immediately preceding pixel that encounters the signal level difference and is consecutive with the immediately preceding pixel if the signal level difference remains within the preset signal level difference. The image display apparatus also has a bit-allocation-processing section that adds a bit to the least significant bit of the image signal having the first number of bits to convert the image signal having the first number of bits into the image signal having the second number of bits, divides the signal level difference when the signal level difference remains within the preset signal level difference, and uses a result of the division to set the signal level difference between the consecutive pixels to the consecutive pixels determined by the decision-processing section.

According to a further embodiment of the present invention, there is provided a tone conversion method of converting an image signal having a first number of bits into an image signal having a second number of bits which is larger than the first number of bits. The method includes sequentially detecting a signal level difference between pixels of an image in a predetermined direction thereof by using the image signal having the first number of bits and determining whether the signal level difference remains within a preset signal level difference. The method also includes determining a pixel which has the same signal level as that of an immediately preceding pixel that encounters the signal level difference and is consecutive with the immediately preceding pixel if the signal level difference remains within the preset signal level difference. The method further includes adding a bit to the least significant bit of the image signal having the first number of bits to convert the image signal having the first number of bits into the image signal having the second number of bits, dividing the signal level difference when the signal level difference remains within the preset signal level difference, and using a result of the division to set the signal level difference between the consecutive pixels to the consecutive pixels determined by the pixel determining step.

According to the above embodiments of the invention, when adding a bit to the least significant bit of the image signal having the first number of bits to convert the image signal having the first number of bits into the image signal having the second number of bits, the signal level difference when the signal level difference remains within the preset signal level difference is divided, and by using a result of the division, the signal level difference between the consecutive pixels is set to the consecutive pixels, the signal level difference of which remains within the preset signal level difference.

Thus, in an image based on the tone-converted image signal, a striped pattern appearing perpendicular to a direction of tone is reduced, thereby obtaining an image having a smooth change in tone.

The concluding portion of this specification particularly points out and directly claims the subject matter of the present invention. However, those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 4 is a table for showing a relationship between a number-of-consecutive-pixels detection signal and a variation;

FIG. 5 is a table for explaining operations of the tone conversion section in a case where a signal level increases;

FIG. 6 is a table for explaining operations of the tone conversion section in a case where the signal level decreases;

FIG. 8 is a table for explaining operations in a case where the number of consecutive pixels is large;

FIG. 9 is a table for explaining other operations in the case where the number of consecutive pixels is large;

FIG. 13 is a diagram for illustrating a variation with respect to a horizontal direction and a variation with respect to a vertical direction; and FIGS. 14A through 14D are illustrations for illustrating results of tone conversion in a case where horizontal and vertical variations have been set.

DETAILED DESCRIPTION

Figure 1:
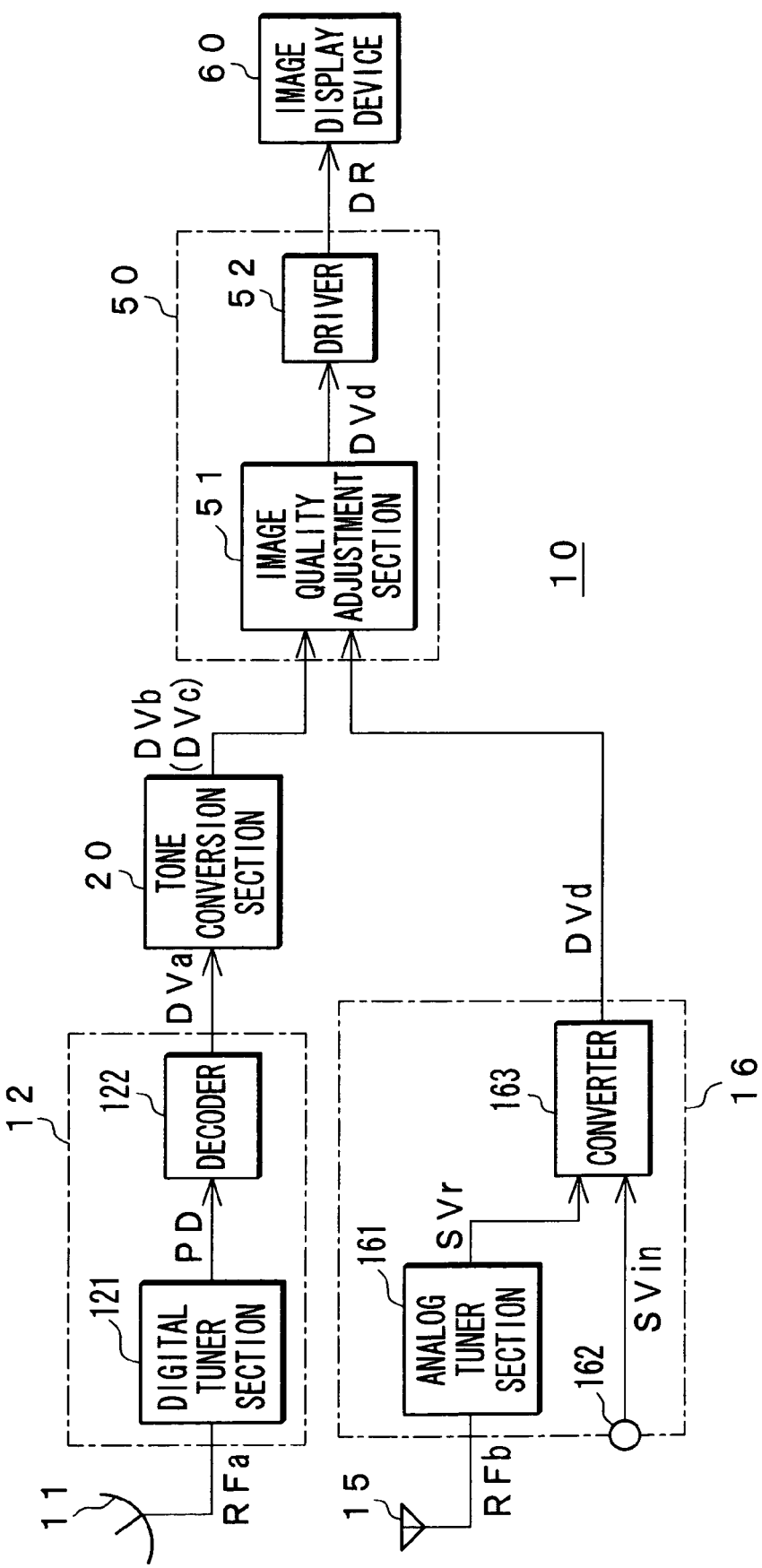
FIG. 1 is a diagram for showing a configuration of an image display apparatus.

The following will now describes embodiments of the present invention with reference to drawings. FIG. 1 shows a configuration of an image display apparatus 10 for receiving a TV broadcast signal and displaying an image of a program thereof.

A received signal RFa obtained by receiving a digital TV broadcast wave by means of an antenna 11 is supplied to a digital tuner section 121 in a digital front end 12. The digital tuner section 121 tunes in to a channel of a signal of a frequency band used in transmission of a program specified by a user from the received signal Rfa and generates an intermediate-frequency signal. Further, it performs digital demodulation, error correction, de-interleaving, de-scrambling and the like on the intermediate-frequency signal, to generate a transport stream. Further, it separates packet data PD of a selected channel from the generated transport stream and supplies it to a decoder 122.

The decoder 122 demodulates the packet data PD and supplies a decoded image signal DVa to a tone conversion section 20. Also, decoded audio data is supplied to an audio-output-processing section, not shown, to be converted into an audio output signal and supplied to a speaker, etc., which is also not shown.

A received signal RFb obtained by receiving an analog TV broadcast wave by means of the antenna 15 is supplied to an analog tuner section 161 in an analog front end 16. The analog tuner section 161 tunes in to a channel of a broadcast signal specified by the user from the received signal RFb, to generate an intermediate-frequency signal. Further, it demodulates the intermediate-frequency signal and supplies an obtained analog image signal SVr to a converter 163. Also, it supplies an audio signal to the above-described audio signal output section.

The converter 163 is equipped with an external analog terminal 162, which can be used to input an analog image signal SVin from outside. The converter 163 converts the image signal SVr supplied from the analog tuner section 161 and the image signal SVin input through the external analog terminal 162 into a digital image signal DVd. In this case, as the converter 163, by using a converter having a larger number of bits than that for digital broadcasting, it is possible to easily obtain an image signal having more tones than the digital TV broadcasting image signal. For example, by using the converter 163 having 10 quantization bits, it is possible to obtain the image signal DVd having more tones than the 8-bit image signal DVa obtained by receiving a digital TV broadcast. The image signal DVd obtained by this converter 163 is supplied to a display-drive-processing section 50.

The tone conversion section 20 performs tone conversion on the image signal DVa received from the decoder 122 in the digital front end 12 by adding a new bit or new bits to its least significant bit (hereinafter, referred to as LSB), thereby generating the image signal DVb. For example, by adding two bits to the 8-bit image signal DVa, a 10-bit image signal DVb is generated which has more tones than the 8-bit image signal DVa. Further, in tone conversion, bit(s) is (are) added in order to avoid a striped pattern from occurring after tone conversion in an image portion having a less difference in tone. The image signal DVb obtained by this tone conversion section 20 is supplied to the display-drive-processing section 50. Details of the tone conversion section 20 will be described later.

An image quality adjustment section 51 in the display-drive-processing section 50 performs non-linear processing, etc. with enhanced computational accuracy on an image signal supplied from the tone conversion section 20 or an image signal supplied from the converter 163 in the analog front end 16, to enable smooth tone representation of even details with suppressed noise all over portions filled with a black color and white skipping portions in an image. For example, it performs processing such as gamma processing or color space conversion with computational accuracy of 14-16 bits on an image signal having 10 quantization bits. An image signal DVd obtained through the non-linear processing at this image quality adjustment section 51 is supplied to a driver 52.

To the driver 52, an image display device 60 such as an LCD panel or a PDP is connected. The driver 52 generates a drive signal DR for driving the image display device 60 based on the image signal DVd received from the image quality adjustment section 51. Further, the driver 52 performs dither processing or the like as necessary, to enable an image to be displayed with most tones that can be displayed on the image display device 60.

In this case, the tone conversion section 20 adds bit(s) to the LSB of the 8-bit image signal DVa, to generate an image signal DVb that has the same number of bits as that of the image signal DVd to be supplied to the image quality adjustment section 51. However, only by adding predetermined bits, for example, "00" to the image signal DVa, the number of tones of an image based on the image signal DVb after addition of the bits is not increased because it is equal to the number of tones of an image based on the image signal DVa before being processed by the tone conversion section 20. To solve this problem, if having decided that a signal level difference between the pixels stays within a preset level difference, the tone conversion section 20 divides the signal level difference between the pixels in the image signal DVa, sets the signal level difference between the consecutive pixels based on a result of the division, and adds bit(s) to a pixel which has the same signal level as that of an immediately preceding pixel that encounters the signal level difference and is consecutive with the immediately preceding pixel.

Thus adding the bits, the tone conversion section 20 can generate the image signal DVb which has a smoother change in tone than that of a case of adding predetermined bits to the image signal DVa.

Figure 2:
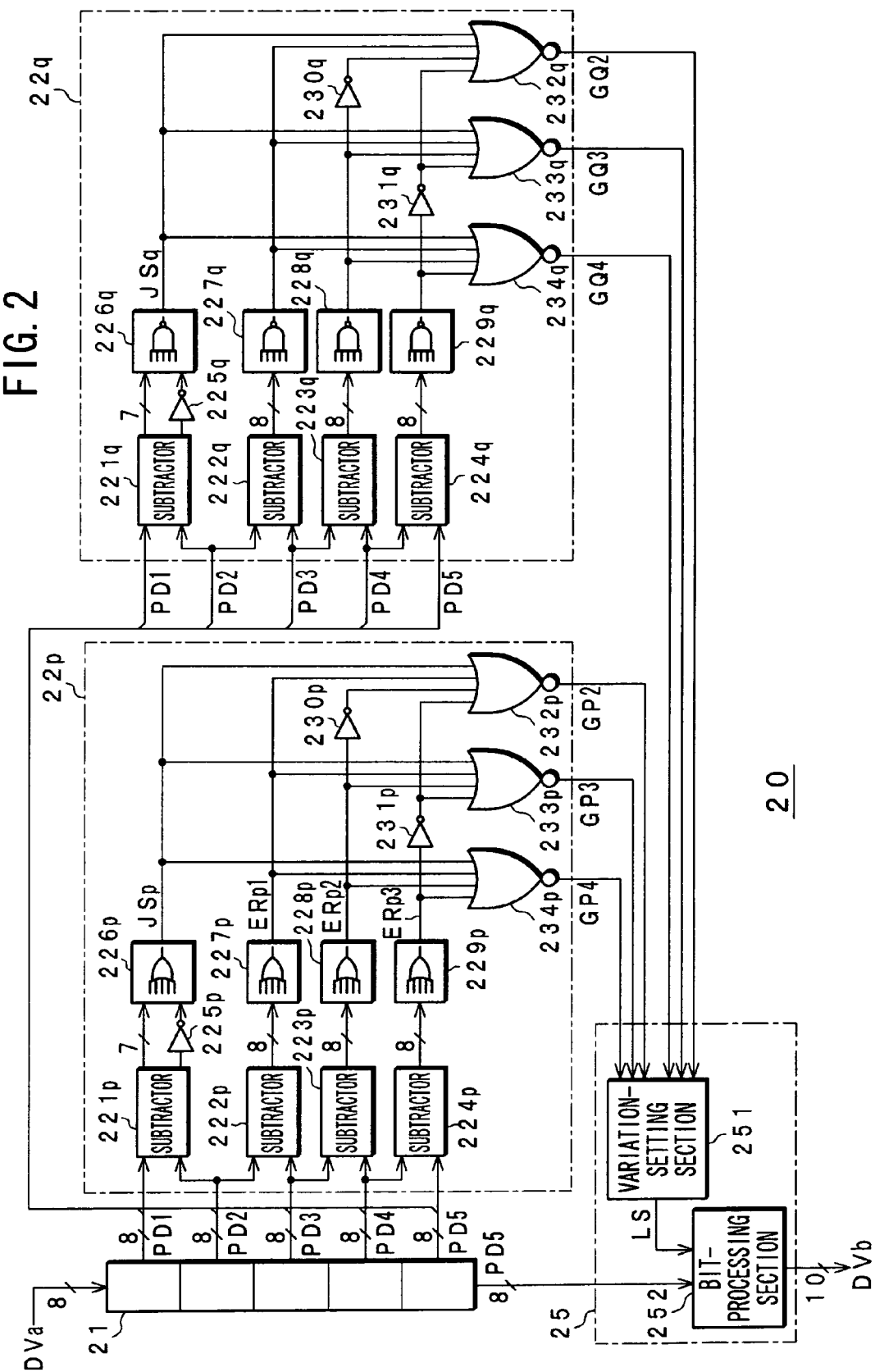
FIG. 2 is a diagram for showing a configuration of a tone conversion section used therein.

FIG. 2 shows a configuration of the tone conversion section 20. It is to be noted that FIG. 2 shows a case of performing tone conversion by which the image signal DVb is generated by adding two bits to the LSB of the image signal DVa. By adding two bits, the image signal DVa having one tone can be converted into multiple tones, in this case, into the image signal DVb having four tones. Accordingly, for example, if having decided that a signal level difference between the pixels is one bit that is a minimum bit unit, the tone conversion section 20 shown in FIG. 2 divides the signal level difference between the pixels in the image signal DVa, sets the signal level difference between the consecutive pixels based on a result of the division, and adds bits to at least four pixels that have the same signal level as that of an immediately preceding pixel that encounters the signal level difference and is consecutive with the immediately preceding pixel. For example, if four pixels are consecutive, it divides one bit, which is a pixel signal level difference between the pixels of the image signal DVa, into four, and sets a variation of each pixel so that one bit of the post-tone conversion image signal DVb may provide signal level difference between the consecutive pixels, and adds bits based on this variation, thereby generating the image signal DVb.

The image signal DVa supplied from the decoder 122 in the digital front end 12 is supplied to a shift register 21 in the tone conversion section 20. The shift register 21 receives and takes in the image signal DVa in pixel units. The shift resister 21 also holds or shifts the taken-in pixel-unit signal (pixel signal). Further, it supplies the held pixel signal to decision-processing sections 22p and 22q. Further, the shift register 21 supplies a pixel signal output from the last stage thereof, to a bit-allocation-processing section 25.

By using the pixel signal received from the shift register 21, the decision-processing section 22p sequentially detects a signal level difference between the pixels of an image in its constant direction (horizontal direction) based on the image signal and decides whether the signal level difference between the pixels has increased by as much as not larger than a preset level difference. Then, if having decided that the difference is not larger than the predetermined value, the decision processing section 22p decides a pixel that has the same signal level as that of an immediately preceding pixel that encounters the signal level difference and is consecutive with the immediately preceding pixel.

By using the pixel signal received from the shift register 21, the decision-processing section 22q sequentially detects a signal level difference between the pixels of the image in its constant direction (horizontal direction) based on the image signal and decides whether the signal level difference between the pixels has decreased by as much as not larger than the preset level difference. Then, if having decided the difference is not larger than the predetermined value, the decision-processing section 22q decides a pixel that has the same signal level as that of an immediately preceding pixel that encounters the signal level difference and is consecutive with the immediately preceding pixel.

In the decision-processing section 22p, a subtractor 221p, an inverter 225p, and an OR gate 226p are used to decide whether a signal level difference between the pixels stays within a preset level difference or not, for example, one bit of the image signal DVa.

The subtractor 221p subtracts a pixel signal PD2 held in the seconds stage of the shift register 21 from a pixel signal PD1 held in its first stage. The inverter 225p logically inverts the LSB of and supplies a subtraction result to the OR gate 226p. Further, the subtractor 221p supplies the signal constituted of seven bits other than the LSB to the OR gate 226p. Accordingly, an output signal JSp (hereinafter referred to as "variation-setting signal JSp") of the OR gate 226p has a low level "L" (logical value "0") if the signal level difference between the pixels has increased by one bit and a high level "H" (logical value "1") if the signal level difference between the pixels is zero or larger than one bit. The variation-setting signal JSp output from this OR gate 226p is supplied to NOR gates 232p, 233p, and 234p, respectively.

The subtractors 222p, 223p, and 224p and OR gates 227p, 228p, and 229p are provided to decide whether inter-pixel signal levels are equal or not. The subtractor 222p subtracts a pixel signal PD3 held in the third stage from the pixel signal PD2 held in the second stage of the shift register 21 and supplies a subtraction result to the OR gate 227p. Accordingly, an output signal ERp1 of the OR gate 227p has the low level "L" if the inter-pixel signal levels are equal and the high level (H) if they are different. The output signal ERp1 of this OR gate 227p is supplied to the NOR gates 232p, 233p, and 234p.

The subtractor 223p subtracts a pixel signal PD4 held in the fourth stage from the pixel signal PD3 held in the third stage of the shift register 21 and supplies a subtraction result to the OR gate 228p. Further, the subtractor 224p subtracts a pixel signal PD5 held in the fifth stage from the pixel signal PD4 held in the fourth stage of the shift register 21 and supplies a subtraction result to the OR gate 229p. Accordingly, output signals ERp2 and ERp3 of the OR gates 228p and 229p each have the low level "L" if the inter-pixel signal levels are equal and the high level (H) if they are different. The output signal ERp2 of the OR gate 228p is supplied to the NOR gates 233p and 234p. Further, the output signal ERp2 of the OR gate 228p is logically inverted by an inverter 230p and then supplied to the NOR gate 232p. The output signal ERp3 of the OR gate 229p is supplied to the NOR gate 234p. Further, the output signal ERp3 of the OR gate 229p is logically inverted by an inverter 231p and then supplied to the NOR gates 232p and 233p.

The NOR gate 232p generates an inverted signal GP2 (hereinafter referred to as "number-of-consecutive-pixels detection signal GP2") of a logical sum of the output signals of the OR gates 226p and 227p and the inverters 230p and 231p and supplies it to a bit-allocation-processing section 25. Accordingly, the number-of-consecutive-pixels detection signal GP2 has the high level "H" if the pixel signal PD1 held in the first stage of the shift register 21 has been increased by one bit with respect to the pixel signal PD2 held in its second stage and only the pixel signal PD2 held in the second stage and the pixel signal PD3 held in the third stage are equal to each other and the low level "L" otherwise. That is, the number-of-consecutive-pixels detection signal GP2 has the high level "H" when the image signal DVa has acquired a pattern shown in FIG. 3A.

The NOR gate 233p generates an inverted signal GP3 (hereinafter referred to as "number-of-consecutive-pixels detection signal GP3") of a logical sum of the output signals of the OR gates 226p, 227p, and 228p and the inverter 231p and supplies it to the bit-allocation-processing section 25. Accordingly, the number-of-consecutive-pixels detection signal GP3 has the high level "H" if the pixel signal PD1 held in the first stage of the shift register 21 has been increased by one bit with respect to the pixel signal PD2 held in its second stage and the pixel signals PD2, PD3 and PD4 held in the second, third, and fourth stages respectively are equal to each other and the low level "L" otherwise. That is, the number-of-consecutive-pixels detection signal GP3 has the high level "H" when the image signal DVa has acquired a pattern shown in FIG. 3B.

The NOR gate 234p generates an inverted signal GP4 (hereinafter referred to as "number-of-consecutive-pixels detection signal GP4") of a logical sum of the output signals of the OR gates 226p, 227p, 228p, and 229p and supplies it to the bit-allocation-processing section 25. Accordingly, the number-of-consecutive-pixels detection signal GP4 has the high level "H" if the pixel signal PD1 held in the first stage of the shift register 21 has been increased by one bit with respect to the pixel signal PD2 held in its second stage and the pixel signals PD2, PD3, PD4, and PD5 held in the second through fifth stages respectively are equal to each other and the low level "L" otherwise. That is, the number-of-consecutive-pixels detection signal GP4 has the high level "H" when the image signal DVa has acquired a pattern shown in FIG. 3C.

The decision-processing section 22q has such a configuration that the OR gates 226p through 229p in the decision-processing section 22p are replaced with NAND gates 226q through 229q. In this case, an output signal JSq (hereinafter referred to as "variation-setting signal JSq") of the NAND gate 226q has the low level "L" if a signal level difference between the pixels has been decreased by one bit and the high level "H" if the signal level difference between the pixels is zero or is decreased greatly than one bit. The variation-setting signal JSq output from this NAND gate 226q is supplied to the NOR gates 232q, 233q, and 234q. Accordingly, when the image signal DVa has acquired a pattern shown in FIG. 3D, a number-of-consecutive-pixels detection signal GQ2 output from the NOR gate 232q has the high level "H". Further, when the image signal DVa has acquired a pattern shown in FIG. 3E, a number-of-consecutive-pixels detection signal GQ3 output from the NOR gate 233q has the high level "H", and when the image signal DVa has acquired a pattern shown in FIG. 3F, a number-of-consecutive-pixels detection signal GQ4 output from the NOR gate 234q has the high level "H".

The bit-allocation-processing section 25, which adds bit(s) to the image signal DVa, divides the signal level difference between the pixels of the image signal DVa and, based on a result of this division, adds bit(s) to consecutive pixels decided by the decision-processing sections 22p and 22q in such a manner as to reduce a signal level difference between the consecutive pixels. This bit-allocation-processing section 25 has, for example, a variation-setting section 251 and a bit-processing section 252.

The variation-setting section 251 sets an inter-pixel variation LS based on the number-of-consecutive-pixels detection signals GP2 through GP4 and GQ2 through GQ4, which are supplied from the decision-processing sections 22p and 22q, respectively. The bit-processing section 252 performs tone conversion by adding bit(s) to the image signal DVa in such a manner that the signal level difference between the pixels may become the inter-pixel variation LS set by the variation-setting section 251, thereby generating a multi-tone image signal DVb having a smooth change in tone.

Based on the number-of-consecutive-pixels detection signals GP2 through GP4 and GQ2 through GQ4 supplied from the decision-processing sections 22p and 22q respectively, the variation-setting section 251 sets an inter-pixel variation LS to pixels which have same signal level as that of an immediately preceding pixel that encounters the signal level difference and is consecutive with the immediately preceding pixel in such a manner as to reduce the signal level difference between the pixels, and supplies the variation LS to the bit-processing section 252.

Actually, if the variation-setting section 251 adds bit(s) to the LSB of the image signal DVa and a change of one bit of the image signal DVa corresponds to a change of n number of bits of the image signal DVb, the variation LS is set in accordance with, for example, Equation (1) as follows:

$$LSa = [n(a-1)/NB] \qquad \text{Equation (1)}$$

It is to be noted that in the Equation (1), "NB" indicates the number of consecutive pixels having the same signal level (hereinafter referred to as "number-of-consecutive-pixels") and "a" indicates order in which the consecutive pixels are arranged. Further, "[ ]" in the Equation (1) indicates a Gaussian symbol, which means to use a value of an integer part.

FIG. 4 shows a relationship between the number-of-consecutive-pixels detection signal and a variation. It is to be noted that as described above, if two bits are added to the LSB of the image signal DVa, one bit of the image signal DVa corresponds to four bits of the image signal DVb. Therefore, a variable n in the Equation (1) is equal to four (n=4).

Figure 3A:
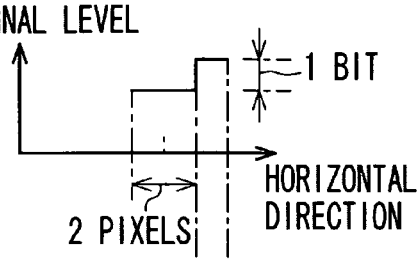
FIGS. 3A through 3F are diagrams each for showing a pattern of an image signal DVa.
Figure 3D:
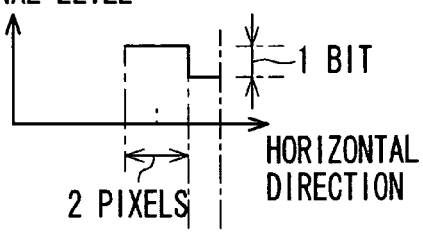

When the number-of-consecutive-pixels detection signal GP2 has had the high level "H", that is, when the image signal DVa has acquired the signal pattern shown in FIG. 3A, two consecutive pixels have the same level, so that "NB=2". Therefore, the variation LS with respect to the first (earliest in time) pixel signal PD3 is "0" and that with respect to the second pixel signal PD2 is "2".

Figure 3B:
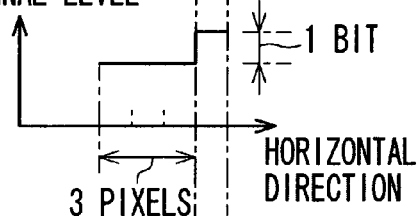

When the number-of-consecutive-pixels detection signal GP3 has had the high level "H", that is, when the image signal DVa has acquired the signal pattern shown in FIG. 3B, three consecutive pixels have the same level, so that "NB=3". Therefore, the variation with respect to the first pixel signal PD4 is "0", the variation LS with respect to the second pixel signal PD2 is "1", and the variation LS with respect to the third pixel signal PD2 is "3". Further, when the number-of-consecutive-pixels detection signal GP3 has had the high level "H", that is, when the image signal DVa has acquired the signal pattern shown in FIG. 3C, four consecutive pixels have the same level, so that "NB=4". Therefore, the variation LS with respect to the first pixel signal PD5 is "0", the variation LS with respect to the second pixel signal PD4 is "1", the variation LS with respect to the third pixel signal PD2 is "2", and the variation LS with respect to the fourth pixel signal PD2 is "3".

When the number-of-consecutive-pixels detection signal GQ2 has had the high level "H" next time, that is, when the image signal DVa has acquired the signal pattern shown in FIG. 3D, a decrease of one bit of the image signal DVa corresponds to a change of a decrease of four bits of the image signal DVb, so that the variable n in the Equation (1) is equal to minus 4 (n=−4).

Further, two consecutive pixels have the same level, so that "NB=2". Therefore, the variation LS with respect to the first (earliest in time) pixel signal PD3 is "0" and the variation LS with respect to the second pixel signal PD2 is "−2". Further, when the number-of-consecutive-pixels detection signal GQ3 has had the high level "H", that is, when the image signal DVa has acquired the signal pattern shown in FIG. 3E, three consecutive pixels have the same level, so that "NB=3". Therefore, the variation LS with respect to the first pixel signal PD4 is "0", the variation LS with respect to the second pixel signal PD3 is "−1", and the variation LS with respect to the third pixel signal PD2 is "−3". Further, when the number-of-consecutive-pixels detection signal GQ3 has had the high level "H", that is, when the image signal DVa has acquired the signal pattern shown in FIG. 3F, four consecutive pixels have the same level, so that "NB=4". Therefore, the variation LS with respect to the first pixel signal PD5 is "0", the variation LS with respect to the second pixel signal PD4 is "−1", the variation LS with respect to the third pixel signal PD3 is "−2", and the variation LS with respect to the fourth pixel signal PD2 is "−3".

The bit-processing section 252 adds bit(s) to the image signal DVa. The bit(s) is (are) actually added so that the inter-pixel variation LS may become a variation LS set by the variation-setting section 251.

It is to be noted that in the case of adding two bits to the LSB of the image signal DVa, if the image signal. DVa before the bit addition has the signal pattern shown in FIG. 3A, the variation of the first pixel signal PD3 is "0", so that bits "00" are added to the LSB, and the variation of the second pixel signal PD2 is "2", so that bits "10" are added to the LSB. Further, if the image signal DVa has acquired the signal pattern shown in FIG. 3B, the variation of the first pixel signal PD4 is "0", so that bits "00" are added to the LSB, and the variation of the second pixel signal PD3 is "1", so that bits "01" are added to the LSB, and the variation of the third pixel signal PD2 is "3", so that bits "11" are added to the LSB. Further, if an image signal DVa has acquired the signal pattern shown in FIG. 3C, the variation of the first pixel signal PD5 is "0", so that bits "00" are added to the LSB, and the variation of the second pixel signal PD4 is "1", so that bits "01" are added to the LSB, and the variation of the third pixel signal PD3 is "2", so that bits "10" are added to the LSB, and the variation of the fourth pixel signal PD2 is "3", so that bits "11" are added to the LSB.

Figure 3E:
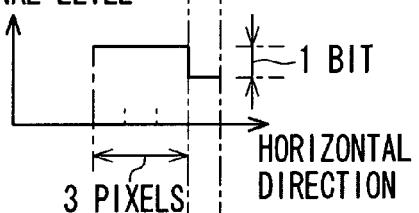
Figure 3C:
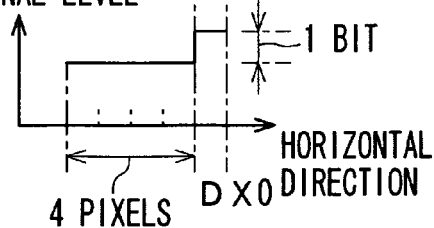
Figure 3F:
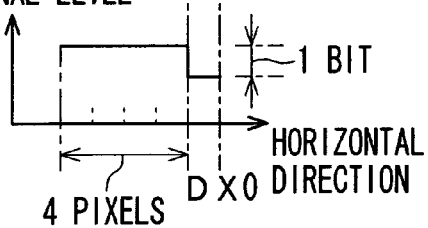

Further, if the signal pattern is such as shown in FIG. 3D, 3E, or 3F, by subtracting the variation LS from the pixel signal to which the LSB bits "00" have been added, it is possible to generate the post-tone conversion image signal DVb. Further, in a case where the level is lowered, by setting a variation with respect to a level of the pixel signal PD1 and then adding bit(s) that correspond(s) to the variation to the pixel signal PD1, it is possible to generate the post-tone conversion image signal DVb without performing subtraction. For example, when the image signal DVa has acquired the signal pattern shown in FIG. 3F, bits "00" are added to the LSB of the first pixel signal PD5. Further, the second pixel signal PD4 is supposed to have been obtained by adding bits "11" to the LSB of the pixel signal PD1. The third pixel signal PD3 is supposed to have been obtained by adding bits "10" to the LSB of the pixel signal PD1 and the fourth pixel signal PD2 is supposed to have been obtained by adding bits "01" to the LSB of the pixel signal PD1. In such a manner, not only in a case where the level is increased but also in a case where it is decreased, only by adding two bits to the LSB of the image signal DVa, it is possible to generate the post-tone conversion image signal DVb.

Next, operations of the tone conversion section 20 will be now described with reference to FIGS. 5 and 6. FIGS. 5 and 6 show the image signal DVa, items of data PD1-PD5 held in register, the variation-setting signal JSp (JSq), the number of consecutive pixels NB, the variation LS, and the image signal DVb. Of these, FIG. 5 shows a case where the signal level of the image signal DVa increases and FIG. 6 shows a case where the signal level of the image signal DVa decreases.

In FIG. 5, when the fourth pixel signal Ha4 (=6) as counting fourth from the horizontal first pixel signal Ha1 (=6, "00000110") is stored in the shift register 21 and the fifth pixel signal Ha5 (=7) are then input and held in the shift register 21 in this order, a level difference is "1" between the pixel signal PD1 (=Ha5) held in the first-stage register and the pixel signal PD2 (Ha4) held in the second-stage register, so that the level of the variation-setting signal JSp changes from the low level (L) to the high level (H). At this point in time, the pixel signals Ha1 through Ha4 (=6) having the same level are held in the second-stage register through the fifth-stage register respectively. Accordingly, the number of consecutive pixels NB that have the same signal level as the pixel signal PD2 held in the second-stage register is "4", so that only the number-of-consecutive-pixels detection signal GP4 has the high level (H). The variation-setting section 251 adds bit(s) to the four consecutive pixels having the same signal level by setting a variation so as to reduce difference in a signal level difference between the pixels. In this case, to add two bits, the variation LS is set to "0" for the first pixel signal among signals of the four consecutive pixels, that is, the pixel signal Ha1 held in the fifth-stage register. For the second pixel signal, that is, the pixel signal Ha2 held in the fourth-stage register, the variation LS is set to "1". Similarly, the variation LS is set to "2" for the pixel signal Ha3 held in the third-stage register and set to "3" for the pixel signal Ha4 held in the second-stage register.

The bit-processing section 252 adds two bits to the LSB of the image signal DVa to generate a 10-bit image signal DVb. Further, the image signal DVb is actually generated so that a signal level difference between the pixels may become a variation LS set by the variation-setting section 251. In this case, the first pixel signal Ha1 in a case where four consecutive pixels having the same level is held in the fifth-stage register, so that bits "00" are added to the pixel signal PD5 to provide a horizontal first pixel signal Hb1 in the image signal DVb. In this case, if bits "00" are added to the pixel signal PD5, the pixel signal Hb1 becomes "24 (="0000011000")".

Next, when a pixel signal Ha6 is input into the shift register 21, the pixel signal Ha2 is held in the fifth-stage register. Since the variation LS has been set to "1" for the pixel signal Ha2, bits "01" are added to the pixel signal Ha2 from the fifth-stage register to provide a horizontal second pixel signal Hb2 in the image signal DVb. In this case, if bits "01" are added to the pixel signal PD5, the pixel signal Hb2 becomes "25 (="0000011001")". It is to be noted that since a signal level difference is "0" between the pixel signal PD1 (=Ha6) held in the first-stage register and the pixel signal PD2 (=Ha5) held in the second-stage register, the level of the variation-setting signal JSp changes from the high level (H) to the low level (L).

When a pixel signal Ha7 is input into the shift register 21, the pixel signal Ha3 is held in the fifth-stage register. At this point in time, the variation LS has been set to "2" for the pixel signal Ha3, so that bits "10" are added to the pixel signal PD5 from the fifth-stage register to provide a horizontal third pixel signal Hb3 in the image signal DVb. In this case, if bits "10" are added to the pixel signal PD5, the pixel signal Hb3 becomes "26 (="0000011010")".

Next, when a pixel signal Ha8 (=8) is input into the shift register 21, the level of the variation-setting signal JSp changes from the low level (L) to the high level (H) because the level difference is "1" between the pixel signal PD1 (=Ha8) held in the first-stage register and the pixel signal PD2 (=Ha) held in the second-stage register. At this point in time, the pixel signals Ha5 through Ha7 (=7) having the same level have been held in the second-stage register through the fourth-stage register respectively. Accordingly, the number of consecutive pixels NB having the same signal level as that of the pixel signal PD2 held in the second-stage register becomes "3", so that only the number-of-consecutive-pixels detection signal GP3 has the high level (H). The variation-setting section 251 adds bit(s) to the three consecutive pixels having the same signal level by setting a variation so as to reduce a difference between the signal level differences between the pixels. That is, as for the three consecutive pixels having the same signal level, the variation LS is set to "0" for the first pixel signal, that is, the pixel signal Ha5 held in the fourth-stage register. Further, the variation LS is set to "1" for the second pixel signal, that is, the pixel signal Ha6 held in the third-stage register. Further, the variation LS is set to "3" for the pixel signal Ha7 held in the second-stage register. Further, the pixel signal Ha4 is held in the fifth-stage register and the variation LS is set to "3" for the pixel signal Ha4. Therefore, the bit-processing section 252 adds bits "11" to the pixel signal PD5 to provide the horizontal fourth pixel signal Hb1 in the image signal DVb. In this case, if bits "11" are added to the pixel signal PD5, the pixel signal Hb4 becomes "27 (="0000011011")".

Similarly, each time when the level of an adjacent pixel increases by one bit, the number of consecutive pixels having the same signal level as that of the immediately preceding pixel that encounters the signal level difference is determined, thereby setting a variation for the consecutive pixels. Further, by adding some bits that corresponds to the set variation, a tone is converted. By performing such processing, as may be clear from a change in level of the image signal DVb shown in FIG. 5, an image portion that has consecutive pixels having the same signal level undergoes tone conversion so as to provide an image having a smooth change in tone. It is to be noted that a broken line in the image signal DVb indicates a change in level when a past tone conversion in which predetermined bits "00" are added to the image signal DVa has been performed.

In FIG. 6, when the horizontal first pixel signal Ha1 (=10, "00001010") is input into the shift register 21 and then the second pixel signal Ha2 (=9, "00001001") is input and held in the shift register 21 in this order, a level difference is "–1" between the pixel signal PD1 (=Ha2) held in the first-stage register and the pixel signal PD2 (=Ha1) held in the second-stage register, so that the level of the variation-setting signal JSq changes from the low level (L) to the high level (H). At this point in time, no pixel signal is held in the third-stage through fifth-stage registers, so that the number of consecutive pixels NB having the same signal level as that of the pixel signal held in the second-stage register is "0", thereby changing the levels of all the number-of-consecutive-pixels detection signals GQ2 through GQ4 to the low level (L). Therefore, the variation LS is set to "0" for the pixel signal Ha1 held in the second-stage register.

Next, also when the third pixel signal Ha3 (=8, "00001000") is input into the shift register 21 and held therein, the variation-setting signal JSq has the high level (H) because the signal level difference is "–1" between the pixel signal PD1 (=Ha3) held in the first-stage register and the pixel signal PD2 (=Ha2) held in the second-stage register. At this point in time, no pixel signal having the same signal level as the signal held in the second-stage register is held in the third-stage through fifth-stage registers, so that the number of consecutive pixels NB becomes "0", thereby changing the levels of all the number-of-consecutive-pixels detection signals GQ2-GQ4 to the low level (L). Therefore, the variation LS is set to "0" for the pixel signal Ha2 held in the second-stage register.

Next, when the fourth pixel signal Ha4 (=8) is input into the shift register 21 and held therein, the level of the variation-setting signal JSq changes from the high level (H) to the low level (L) because the signal level difference is "0" between the pixel signal PD1 (=Ha4) held in the first-stage register and the pixel signal PD2 (=Ha3) held in the second-stage register. Accordingly, the number-of-consecutive-pixels detection signals GQ2-GQ4 all have the low level (L). Therefore, the variation LS is set to "0" for the pixel signal Ha3 held in the second-stage register.

When the fifth pixel signal Ha5 (=7) is input into the shift register 21 and held therein, the level of the variation-setting signal JSq changes from the low level (L) to the high level (H) because the level difference is "–1" between the pixel signal PD1 (=Ha5) held in the first-stage register and the pixel signal PD2 (=Ha4) held in the second-stage register. At this point in time, the pixel signals Ha3 through Ha4 (=8) having the same level have been held in the second-stage register through the third-stage register, respectively. Accordingly, the number of consecutive pixels NB having the same signal level as the pixel signal PD2 held in the second-stage register becomes "2", so that only the number-of-consecutive-pixels detection signal GQ2 has the high level (H). The variation-setting section 251 adds bit(s) to the two consecutive pixels having the same signal level by setting a variation so as to reduce a difference between the signal level difference between the pixels. In this case, as for the two consecutive pixels having the same signal level, the variation LS is set to "0" for the first pixel signal, that is, the pixel signal Ha3 held in the third-stage register.

Further, the variation LS is set to "–2" for the second pixel signal, that is, the pixel signal Ha4 held in the second-stage register. It is to be noted that if the variation LS is already set for the pixel signal, subsequently, bit(s) is (are) added on the basis of a variation LS which is set in accordance with how many consecutive pixels have the same signal level, to enable an image to be displayed with a smooth change in tone.

Further, when the fifth pixel signal Ha5 (=7, "00000111") is input into the shift register 21 and held therein, the pixel signal Ha1 is held in the fifth register and the variation LS is set to "0" for the pixel signal Ha1, so that bits "00" are added to the pixel signal PD5 (=Ha1) to provide the horizontal first pixel signal Hb1 in the image signal DVb. In this case, if bits "00" are added to the pixel signal PD5, the pixel signal Hb1 becomes "40 (="0000101000")".

When the sixth and seventh pixel signals Ha6 and Ha7 are sequentially input into the shift register 21 and held therein, the pixel signals Ha2 and Ha3 are sequentially held in the fifth-stage register. Further, since the variation LS is set to "0" for the pixel signals Ha2 and Ha3, bits "00" are added to the pixel signal PD5 (=Ha2, Ha3) to provide the horizontal second and third pixel signals Hb2 and Hb3 in the image signal DVb. In this case, if bits "00" are added to the pixel signal PD5, the pixel signal Hb2 becomes "36 (="0000100100")" and the pixel signal Hb3 becomes "32 (="0000100000")".

When the eighth pixel signal Ha8 (=6) is input into the shift register 21 and held therein, the variation-setting signal JSq has the high level (H) because the signal level difference is "−1" between the pixel signal PD1 (=Ha8) held in the first-stage register and the pixel signal PD2 (=Ha7) held in the second-stage register. At this point in time, the pixel signals Ha5 through Ha7 (=7) having the same level have been held in the second-stage register through the fourth-stage register respectively. Accordingly, the number of consecutive pixels NB having the same signal level as that of the pixel signal PD2 held in the second-stage register becomes "3", so that only the number-of-consecutive-pixels detection signal GQ3 has the high level (H). The variation-setting section 251 adds bits to the three consecutive pixels having the same signal level by setting a variation so as to reduce a difference between the signal level difference between the pixels. In this case, as for the three consecutive pixels having the same signal level, the variation LS is set to "0" for the first pixel signal, that is, the pixel signal Ha7 held in the fourth-stage register. Further, the variation LS is set to "−1" for the second pixel signal, that is, the pixel signal Ha6 held in the third-stage register. Further, the variation LS is set to "−3" for the third pixel signal, that is, the pixel signal Ha7 held in the second-stage register.

Further, when the eighth pixel signal Ha8 (=6) is input into the shift register 21 and held therein, the pixel signal Ha4 is held in the fifth register and the variation LS is set to "−2" for the pixel signal Ha4, so that bits "10" are added to a bit string of a value obtained by subtracting 1 from the pixel signal PD5 (=Ha4) to provide the horizontal fourth pixel signal Hb4 in the image signal DVb. Therefore, the pixel signal Hb1 becomes "30 (="0000011110")".

Similarly, each time when the level of an adjacent pixel decreases by one bit, consecutive pixels having the same signal level is decided to set an inter-pixel variation for the consecutive pixels thus determined. Further, by adding bit(s) corresponding to the set variation, a tone is converted. By performing such processing, as may be clear from a change in level of the image signal DVb shown in FIG. 6, an image portion that has consecutive pixels having the same signal level, even if the signal level decreases, undergoes tone conversion so as to provide an image having a smooth change in tone. It is to be noted that a broken line in the image signal DVb indicates a change in level when a past tone conversion has been performed to add predetermined bits "00" to the image signal DVa.

Thus, each time when the level of an adjacent pixel increases or decreases by one bit, consecutive pixels having the same signal level are decided to set an inter-pixel variation for the consecutive pixels, based on which variation, tone conversion is performed to add bits, thereby enabling the post-tone conversion image to get smooth change in tone.

Figures 7A, 7B, 7C:
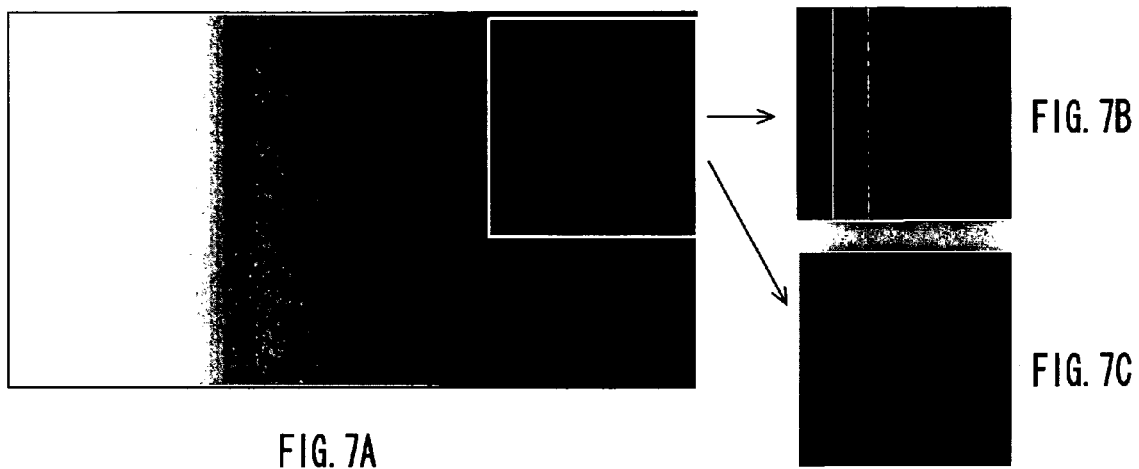
FIGS. 7A through 7C are representations each for showing results of tone conversion.

For example, FIGS. 7A through 7C show results of tone conversion; in a case where tone conversion is performed on an image based on a Ramp signal such as shown in FIG. 7A, if the image signal DVb is generated by adding predetermined bits "00" to the image signal DVa, an image is provided which has a step-wise difference in luminance as shown in FIG. 7B. However, if consecutive pixels having the same signal level are decided to set a variation so as to reduce a difference in signal level difference between the consecutive pixels, an image shown in FIG. 7C can be provided which has a smoother change in tone than FIG. 7B.

In the above embodiment, the tone of the image signal DVa has been increased four-fold in order to generate the image signal DVb by adding two bits to the LSB of the image signal DVa, so that a five-stage shift register has been used to upgrade the tone of the pixel level of up to four consecutive pixels having the same signal level. However, in the case of using more than two bits to be added, for example, three bits, a nine-stage shift register can be used to add bits by setting a variation as described above, to generate the image signal DVb having a smooth change in tone.

Further, in the image signal DVa, it may be thought of that the predetermined number of consecutive pixels having the same signal level exceeds, for example, four. In such a case, bits are added by setting a variation in such a manner as to reduce a difference in signal level difference between the consecutive pixels. Further, at a boundary over which the signal level changes, the signal level may be made to change continuously. That is, bits are added to a predetermined number of pixels starting from an immediately preceding pixel that encounters a signal level difference of one bit, by setting a variation so as to reduce a difference in signal level difference between the pixels.

FIGS. 8 and 9 show the operations in a case where there are many consecutive pixels and, for example, an 11-stage shift register is used to detect up to 10 pixels having the same signal level. FIG. 8 shows a case where bits are added to a region of the consecutive ten pixels by setting a variation in such a manner as to reduce a difference in signal level difference between the pixels, and FIG. 9 shows a case where the signal level is made to change continuously over a boundary where the signal level changes. It is to be noted that in the case of using the 11-stage shift register, the subtractor and the OR gate in the decision-processing section 22p are added in accordance with the number of stages of the shift register 21, to increase the number of inputs of the NOR gate. Further, the subtractor and the NAND gate in the decision-processing section 22q may be added in accordance with the number of stages of the shift register 21, to increase the number of the inputs of the NOR gate.

In FIG. 8, when the horizontal pixel signal Ha1-Ha10 (=6) counting from the first one to 10'th one are input into the shift register 21 and then the 11'th pixel signal Ha11 (=7) is input into the shift register 21 and held therein, the level of the variation-setting signal JSp changes from the low level (L) to the high level (H) because the level difference is "1" between the pixel signal PD1 (=Ha11) held in the first-stage register and the pixel signal PD2 (=Ha10) held in the second-stage register. At this point in time, the pixel signals Ha1-Ha10 (=6) having the same level are held in the second-stage through 11'th-stage registers. Accordingly, the number of consecutive pixels NB is "10", which is the number of pixels having the same signal level as that of the pixel signal PD2 held in the second-stage register. The variation-setting section 251 sets the variation LS for 10 consecutive pixels having the same level based on the above Equation (1) in such a manner as to reduce a difference in signal level difference between the pixels. Therefore, the variation LS is set to "0" for the pixel signals PD11 (=Ha1), PD10 (=Ha2), and PD9 (=Ha3) held in the 11th-stage through ninth-stage registers. Further, the variation LS is set to "1" for the pixel signals PD8 (=Ha4) and PD7 (=Ha5) held in the eighth-stage through seventh-stage registers. The variation LS is set to "2" for the pixel signals PD6 (=Ha6), PD5 (=Ha7), and PD3 (=Ha8) held in the sixth-stage through fourth-stage registers. The variation LS is set to "3" for the pixel signals PD3 (=Ha9) and PD2 (=Ha10) held in the third-stage through second-stage registers. By thus setting the variation LS, the bit-processing section 252 adds two bits to the LSB of the image signal DVa to generate the 10-bit image signal DVb. Further, the image signal DVb is generated so that the signal level difference between the pixels may become a variation LS set by the variation-setting section 251. Accordingly, the signal level of the image signal DVb changes to "24, 24, 24, 25, 25, 26, 26, 26, 27, and 27" in this order.

In a case shown in FIG. 9, when the horizontal pixel signal Ha1-Ha10 (=6) counting from the first one to 10'th one are input into the shift register 21 and then the 11'th pixel signal Ha11 (=7) is input into the shift register 21 and held therein to decide that the number of consecutive pixels NB having the same level as that of the pixel signal held in the second-stage register is "10", the variation LS is set to "0" for the pixel signals PD11 (=Ha1) through PD5 (=Ha7) held in the 11'th-stage through fifth-stage registers. Further, for the pixel signal PD4 (=Ha8) held in the fourth-stage register, the variation LS is set to "1". For the pixel signal PD3 (=Ha9) held in the third-stage register, the variation LS is set to "2". For the pixel signal PD2 (=Ha10) held in the second-stage register, the variation LS is set to "3". By thus setting the variation LS, the bit-processing section 252 adds two bits to the LSB of the image signal DVa to generate the 10-bit image signal DVb. Further, the image signal DVb is generated so that the signal level difference between the pixels may become a variation LS set by the variation-setting section 251. Accordingly, the signal level of the image signal DVb changes to "24, 24, 24, 24, 24, 24, 25, 26, and 27" in this order. In such a manner, even if many consecutive pixels have the same signal level, it is possible to obtain an image having a smooth change in tone by adding bit(s) to a region of the consecutive pixels in such a manner as to reduce a difference between the signal level difference between the pixels or by adding bits so that the signal level may change continuously over a boundary where the signal level changes.

Figure 10:
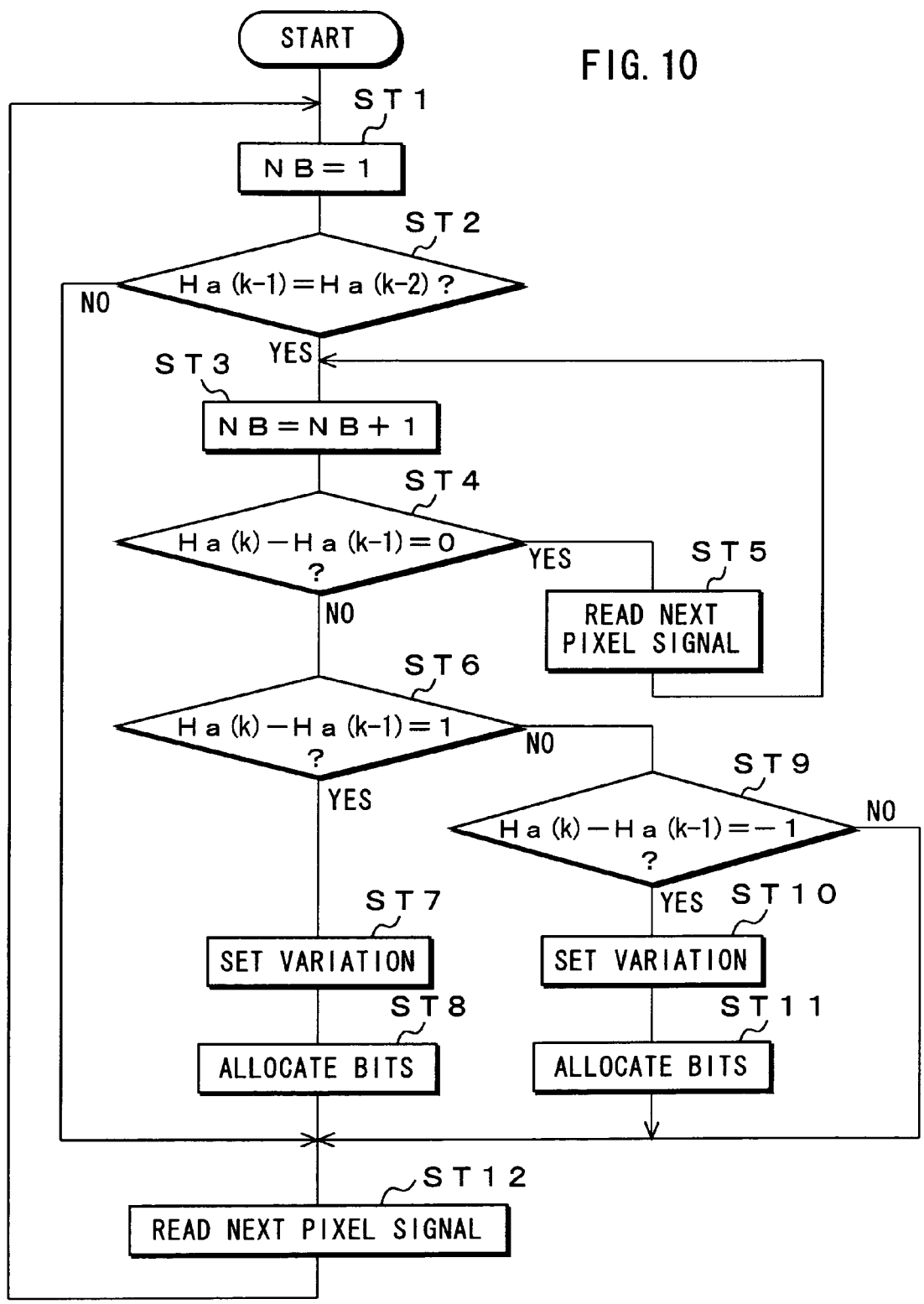
FIG. 10 is a flowchart for showing tone conversion operations.

Further, the operations of the above-described tone conversion section can be performed by software processing by use of computer. FIG. 10 is a flowchart for showing tone conversion operations. At step ST1, the computer sets the number of consecutive pixels NB to "1" and the operation goes to step ST2.

At the step ST2, the computer decides whether the pixel signal Ha (k-1) of an immediately preceding pixel is equal in signal level to the pixel signal Ha (k-2) of a pixel preceding the current pixel by two pixels. If the signal levels of the pixel signals Ha (k-1) AND Ha (k-2) are equal to each other, the operation goes to step ST3 and, if they are not equal, the operation goes to step ST12.

At the step ST3, the computer adds "1" to the number of consecutive pixels NB and sets a result of this addition newly as a value of the number of consecutive pixels NB. The operation then goes to step ST4.

At the step ST4, the computer decides whether the pixel signal Ha (k) of the current pixel is equal in signal level to the pixel signal Ha (k-1) of the immediately preceding pixel. If their signal levels are equal to each other, the operation goes to step ST5 and, if they are not equal, the operation goes to step ST6.

At the step ST5, the computer reads the pixel signal of the next pixel and newly sets the read pixel signal as the pixel signal Ha (k) of the current pixel. The operation then returns to step ST3.

At the step ST6, the computer decides whether a value obtained by subtracting the pixel signal Ha (k-1) from the pixel signal Ha (k) is "1". If it is "1", the operation goes to step ST7. If it is not "1", the operation goes to step ST9.

At the step ST7, the computer sets a variation. In this variation setting, the variation calculated on the basis of, for example, the above Equation (1) is set to each of the consecutive pixels having the same signal level as that of the pixel signal of the pixel immediately preceding the current pixel. The operation then goes to step ST8. It is to be noted that in this variation setting, the variation may be set as shown in FIG. 8 or 9 above.

At the step ST8, the computer adds bit(s). That is, the computer adds bit(s) so that a variation of an inter-pixel signal level may become the variation set at the step ST7.

At the step ST9, the computer decides whether a value obtained by subtracting the pixel signal Ha (k-1) of the immediately preceding pixel from the pixel signal Ha (k) of the current pixel is "−1". If it is "−1", the operation goes to step ST10. If it is not "−1", the operation goes to the step ST12.

At the step ST10, the computer sets a variation. In this variation setting, the computer sets a variation calculated on the basis of, for example, the above Equation (1) to each of the consecutive pixels having the same signal level as that of the pixel signal of the pixel immediately preceding the current pixel. The operation then goes to step ST11. It is to be noted that in this variation setting, the variation may be set as shown in FIG. 8 or 9 above.

At the step ST11, the computer adds bits. That is, the computer adds bits so that a variation of the inter-pixel signal level may become the variation set at the step ST10.

At step ST12, the computer reads the pixel signal of the next pixel and sets it as the pixel signal of the current signal Ha (k). The operation then returns to the step ST1. If such processing is performed for each of lines, a horizontal change in tone can be smoothed.

Although the above embodiment has set a variation in accordance with a horizontal change or continuity of the pixel level to smooth as horizontal change in tone, a vertical change in tone can be smoothed by setting a variation in accordance with not only horizontal but also vertical changes or continuity of the pixel level.

Figure 11:
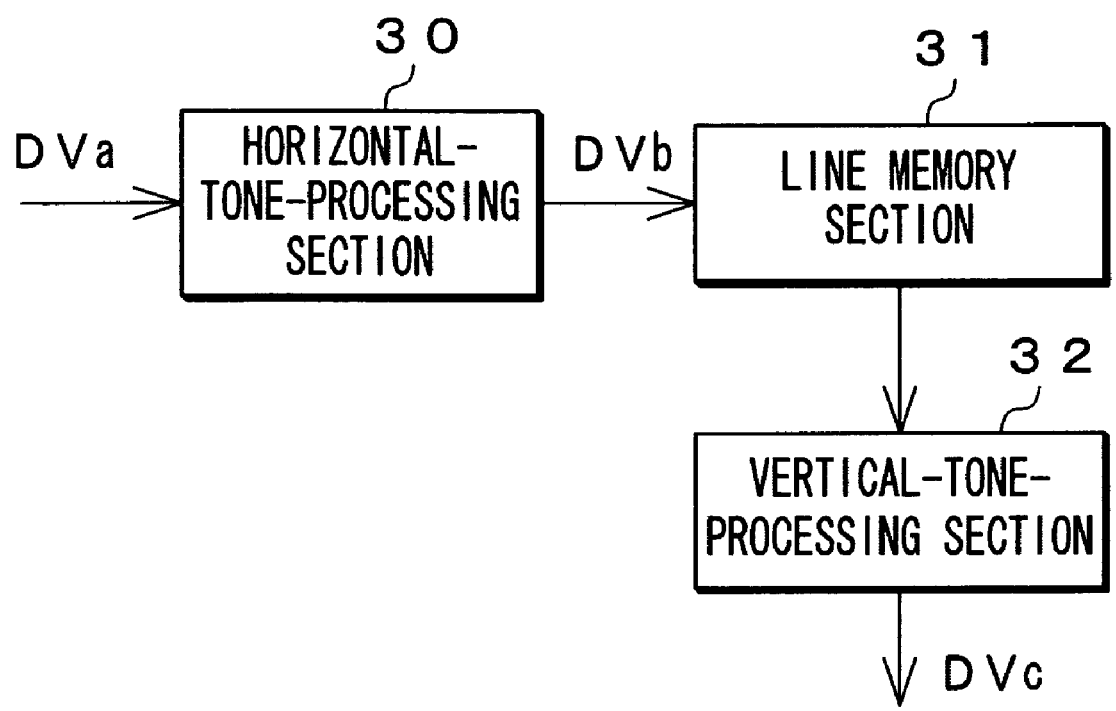
FIG. 11 is a diagram for showing another configuration of the tone conversion section.

FIG. 11 shows a case where horizontal and vertical changes in tone are smoothed as another configuration of the tone conversion section. A horizontal-tone-processing section 30 is configured in the same manner as the above-described tone conversion section 20, to generate the image signal DVb. Therefore, explanation of the horizontal-tone-processing section will be omitted.

A line memory section 31 stores the image signal DVb received from the horizontal-tone-processing section 30 for each line. This line memory section 31 sequentially stores a plurality of lines of the image signal DVb received from the horizontal-tone-processing section 30 so that vertical continuity of the level can be decided. For example, to detect up to four consecutive pixels having the same signal level, it is configured so that it can store at least five lines of the image signal DVb.

A vertical-tone-processing section 32 reads the pixel signals in order of vertical pixels from the line memory section 31, corrects bits added by the horizontal-tone-processing section 30 in accordance with a vertical change in signal level or the number of consecutive pixels having the same signal level, and performs tone conversion so that an image which is smooth not only horizontally but also vertically can be obtained, thereby generating an image signal DVc.

Figure 12:
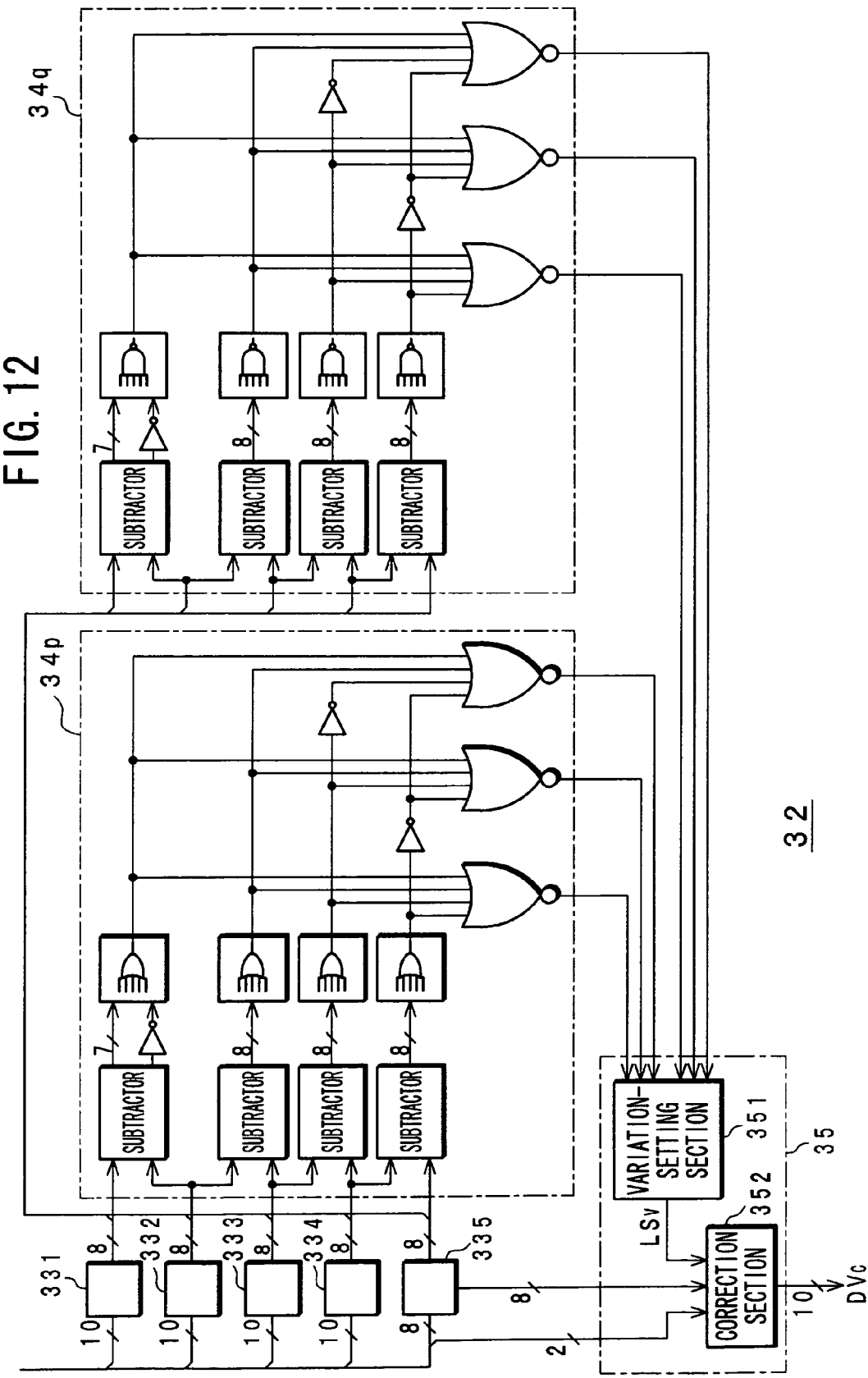
FIG. 12 is a diagram for showing a configuration of a vertical tone processing section.

FIG. 12 shows a configuration of the vertical-tone-processing section 32. Registers 331-335 hold the pixel signals read out of the line memory section 31 in the order of the vertical pixels. For example, the pixel signal read out of the line memory in which an image signal of the current line is stored is supplied to the register 331. Further, the pixel signal read out of the line memory in which an image signal of the immediately preceding line is stored is supplied to the register 332; the pixel signal read out of the line memory in which an image signal of the line preceding the current line by two lines is stored is supplied to the register 333; the pixel signal read out of the line memory in which an image signal of the line preceding the current line by three lines is stored is supplied to the register 334; and the pixel signal read out of the line memory in which an image signal of the line preceding the current line by four lines is stored is supplied to the register 335.

A decision-processing section 34p performs almost the same processing as the decision-processing section 22p by using the pixel signal held in the registers 331-335 and, if the signal level difference between the pixels has increased by one bit, the decision-processing section 34p generates the number-of-consecutive-pixels detection signal indicative of the number of consecutive pixels having the same signal level and supplies it to a bit-allocation-processing section 35.

A decision-processing section 34q performs almost the same processing as the decision-processing section 22q by using the pixel signal held in the registers 331-335 and, if the signal level difference between the pixels has decreased by one bit, the decision-processing section 34q generates a signal indicative of the number of consecutive pixels having the same signal level and supplies it to the bit-allocation-processing section 35.

To the pixel signal stored in the line memory section 31, bits have been added so that a horizontal smooth change in tone can be obtained. Accordingly, the registers 331-335 are supplied with the pixel signal is added which is a pixel signal before adding bits other than those added by the horizontal-tone-processing section 30. For example, if two bits have been added as described above, the pixel signal excluding these added bits, that is, the pixel signal of the image signal DVa is supplied.

A variation-setting section 351 in the bit-allocation-processing section 35, like the above-described tone conversion section 20, sets a variation LSv based on the number-of-consecutive-pixels detection signal received from the decision-processing sections 34p and 34q. A correction section 352 corrects bits added to the pixel signal held in the register 335 so as to provide a smooth change in tone not only horizontally but also vertically, based on the variation LSv set for the pixel signal held in the register 335.

Figure 13:
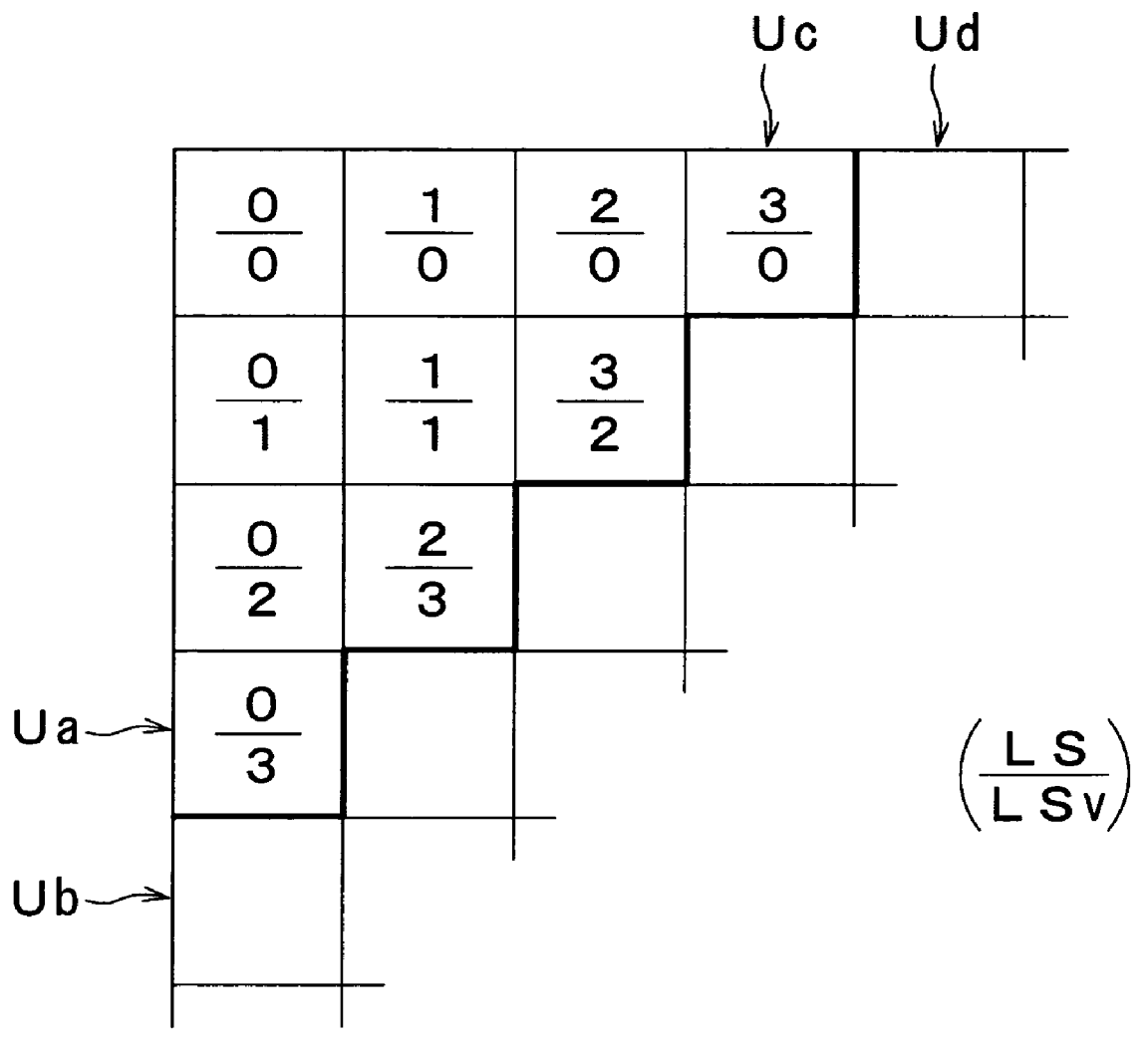

FIG. 13 shows a variation with respect to the horizontal direction and a variation with respect to the vertical direction in a case where a pixel boundary having a step of one bit is shaped stepwise. In this case, if it is supposed that the variation is set as described above, the variation LS with respect to the horizontal direction takes on an upper value. The variation LSv with respect to the vertical direction takes on a lower value. Accordingly, if bits are added based only on the variation LS with respect to the horizontal direction, a tone difference becomes conspicuous between, for example, a pixel Ua located at position (4, 1) and a pixel Ub located at position (5, 1). Similarly, if bits are added based only on the variation LSv with respect to the vertical direction, the tone difference becomes conspicuous between a pixel Uc located at position (1, 4) and a pixel Ud located at position (1, 5).

Therefore, the bits added by means of the horizontal-tone-processing section 30 are corrected in accordance with the variation LSv with respect to the vertical direction. In this correction, for example, the bits are corrected so that they may be added in accordance with an average value of the variation LS with respect to the horizontal direction and the variation LSv with respect to the vertical direction. Further, since an image has a higher resolution horizontally, a larger weight is applied to the variation LS with respect to the horizontal direction to calculate an average value of the horizontal and vertical variations LS and LSv with respect to the horizontal and vertical directions so that the bits may be corrected to be added in accordance with the thus obtained average value.

By thus adding bits by setting a variation so as to provide a smooth change in tone horizontally and vertically, it is possible to obtain an image having a further smoother change in tone than the case of adding bits in accordance with a one-directional variation.

For example, like a related art if tone conversion is performed on an image having a smaller change in tone like a cloud in a cloudy weather, as shown in FIG. 14A, a portion with a lower tone appears as a striped pattern. However, by setting a variation both horizontally and vertically and adding bits based on both variations as by the above embodiment of the present invention, as shown in FIG. 14B, tone conversion can be performed without unreal striped patterns, etc. appearing. Further, even in an image of smooth ball-shaped or cylinder-shaped object with a smaller change in tone on which surroundings are transferred, a portion with a low tone appears as a striped pattern as shown in FIG. 14C if tone conversion is performed like the related art. However, by adding bits as described above, tone conversion can be performed without a portion with a low tone appearing as a striped pattern as shown in FIG. 14D. Moreover, it is also possible to prevent striped patterns, etc. from appearing in surroundings of a lamp in the evening dew.

Further, if the number of consecutive pixels having the same signal level becomes large vertically, by performing much the same processing as that shown in the above FIG. 9, it is necessary only to store five lines of the image signal in the line memory, so that tone conversion with a smooth change in tone can be performed even if the number of the line memories is small.

Although in the above embodiments, if a difference of one bit has occurred between the pixels in the image signal DVa, a variation has been set by deciding the number of consecutive pixels having the same signal level as the immediately preceding pixel that encounters this level difference, even if a bit difference larger than one bit has occurred, it is also possible to set a variation in accordance with the level difference by deciding the number of consecutive pixels having the same signal level as the immediately preceding pixel that encounters this level difference. Further, if the bit difference is made larger for setting of a variation, for example, a boundary in a subject may have a smooth tone to decrease sharpness of an image. Therefore, the bit difference is set to such an extent that striped patterns, etc. may not appear in an image portion having a small change in tone. It should be understood by those skilled in the art that various modifications, combinations, sub-combinations and alterations may occur depending on design requirements and other factors insofar as they are within the scope of the appended claims or the equivalents thereof.

The invention claimed is:

1. A tone conversion apparatus that converts an image signal having a first number of bits into an image signal having a second number of bits, the second number of bits being larger than the first number of bits, the apparatus comprising:

a decision-processing section that sequentially detects a signal level difference between pixels of an image in a predetermined direction thereof by using the image signal having the first number of bits, determines whether the signal level difference remains within a preset signal level difference, and determines a pixel which has the same signal level as that of an immediately preceding pixel that encounters the signal level difference and is consecutive with the immediately preceding pixel if the signal level difference remains within the preset signal level difference; and a bit-allocation-processing section that adds a bit to the least significant bit of the image signal having the first number of bits to convert the image signal having the first number of bits into the image signal having the second number of bits, divides the signal level difference when the signal level difference remains within the preset signal level difference, and uses a result of the division to set the signal level difference between the consecutive pixels to the consecutive pixels determined by the decision-processing section.

2. The tone conversion apparatus according to claim 1, wherein the decision-processing section determines whether the signal level difference is one bit of the image signal having the first number of bits.

3. The tone conversion apparatus according to claim 1, wherein the decision-processing section detects the signal level differences between the pixels in at least one of horizontal and vertical directions of the image based on the image signal.

4. The tone conversion apparatus according to claim 1, wherein if the number of the consecutive pixels is larger than a predetermined number, the bit-allocation-processing section divides the signal level difference between the pixels in the image signal having the first number of bits when the signal level difference remains within the preset signal level difference and sets the signal level difference between the consecutive pixels to the predetermined number of consecutive pixels starting from the immediately preceding pixel that encounters the signal level difference.

5. An image display apparatus that converts an image signal having a first number of bits into an image signal having a second number of bits, the second number of bits being larger than the first number of bits, and that generates a display drive signal to drive a display device based on the image signal having the second number of bits, the apparatus comprising:

a decision-processing section that sequentially detects a signal level difference between pixels of an image in a predetermined direction thereof by using the image signal having the first number of bits, determines whether the signal level difference remains within a preset signal level difference, and determines a pixel which has the same signal level as that of an immediately preceding pixel that encounters the signal level difference and is consecutive with the immediately preceding pixel if the signal level difference remains within the preset signal level difference; and a bit-allocation-processing section that adds a bit to the least significant bit of the image signal having the first number of bits to convert the image signal having the first number of bits into the image signal having the second number of bits, divides the signal level difference when the signal level difference remains within the preset signal level difference, and uses a result of the division to set the signal level difference between the consecutive pixels to the consecutive pixels determined by the decision-processing section.

6. A tone conversion method of converting an image signal having a first number of bits into an image signal having a second number of bits, the second number of bits being larger than the first number of bits, the method comprising:

sequentially detecting a signal level difference between pixels of an image in a predetermined direction thereof by using the image signal having the first number of bits and determining whether the signal level difference remains within a preset signal level difference;

determining by use of a processor a pixel which has the same signal level as that of an immediately preceding pixel that encounters the signal level difference and is consecutive with the immediately preceding pixel if the signal level difference remains within the preset signal level difference; and adding a bit to the least significant bit of the image signal having the first number of bits to convert the image signal having the first number of bits into the image signal having the second number of bits, dividing the signal level difference when the signal level difference remains within the preset signal level difference, and using a result of the division to set the signal level difference between the consecutive pixels to the consecutive pixels determined by the pixel determining step.

* * * * *